United States Patent [19]

Brosig et al.

[11] Patent Number: 5,102,685
[45] Date of Patent: Apr. 7, 1992

[54] METHOD AND JIG FOR LCD-PRODUCTION

[75] Inventors: Stefan Brosig, Stuttgart; Jürgen Waldmann, Schönaich; Monika Stoitzner, Nürtingen; Martin Barnaba, Stuttgart; Helmut Thaler, Dettingen; Hans-Jörg Wirsig, Kornwestheim, all of Fed. Rep. of Germany

[73] Assignee: Nokia Unterhaltungselektronik GmbH, Fed. Rep. of Germany

[21] Appl. No.: 477,297

[22] Filed: Feb. 8, 1990

[30] Foreign Application Priority Data

Feb. 11, 1989 [DE] Fed. Rep. of Germany ....... 3904126

[51] Int. Cl.[5] .............................................. B05D 3/12
[52] U.S. Cl. .................................... 427/26; 427/108; 427/165; 427/240
[58] Field of Search ................ 427/165, 240, 26, 108; 428/1

[56] References Cited

U.S. PATENT DOCUMENTS

| 4,271,209 | 6/1981 | DePalma et al. | 427/240 |
| 4,575,190 | 3/1986 | Wood et al. | 428/1 |
| 4,806,504 | 2/1989 | Cleeves | 427/240 |
| 4,919,633 | 4/1990 | Yamgazaki et al. | 427/240 |

FOREIGN PATENT DOCUMENTS 624529 2/1982 Switzerland .

Primary Examiner—Janyce Bell
Attorney, Agent, or Firm—Ware, Fressola, Van Der Sluys & Adolphson

[57] ABSTRACT

In a process for applying orientation layers to cell plates (11.o, 11.u), the cell plates are arranged in relation to a centrifuge rotational axis (14) so that the plate planes lie parallel to the rotational axis. The centrifugal forces then act over the entire plate surfaces in the same direction in each case. This leads to a homogeneous pre-alignment of the orientation layer molecules.

Because a homogeneous pre-alignment of orientation layer molecules can be achieved with this process, an improved orientation effect can be obtained.

7 Claims, 1 Drawing Sheet

METHOD AND JIG FOR LCD-PRODUCTION

BACKGROUND OF THE INVENTION

1. Field of the Invention

The invention relates to a process and a device for manufacturing liquid crystal cells. In such processes and with such devices, single cell plates, several cell plates, or cells which are already filled with liquid crystal are processed successively in the first case and simultaneously in the second case.

2. Description of the Prior Art

Centrifuging processes with cell plates are well-known manufacturing processes. Here, a material in liquid form is applied to a single cell plate or a multitude of cell plates which have still not been separated from one another. The plate is centrifuged so that only a thin liquid film remains and a solid layer results by evaporation of a solvent. This layer may be an orientation layer, an insulation layer or a photo-resist layer.

SUMMARY OF THE INVENTION

The processes according to the invention are characterized by the fact that a cell plate or a cell filled with liquid crystal is secured to a centrifuging device so that the centrifuge rotational axis does not transverse the visible zone of the plate or the cell, and is then centrifuged.

The principle according to the invention is only carried out on cells filled with liquid crystal if they contain bubbles. In the past, attempts were made to force such bubbles into an invisible peripheral zone by placing the cells upright and heating them. This method was only successful with relatively large bubbles With the process according to the invention even the smallest bubbles can be displaced. They align themselves along the edge which is closest to the centrifuge rotational axis.

The principle according to the invention is applied to cell plates when an orientation layer must be applied. When positioning the plate, care must be taken to ensure that the centrifuge rotational axis not only fails to transverse the visible zone of the plate, but that the projection of the centrifuge rotational axis on the plate does not transverse the visible plate zone. This arrangement of the rotational axis and the plate results in the centrifugal force acting in the same direction at each point of the plate. The flow directions of the centrifuged orientation layer material are parallel to one another at all points on the plate. The uniform flow direction results in a uniform preferred alignment of the orientation material molecules. This preferred orientation is "frozen" on evaporation of the solvent. In the traditional process, plates to be coated stand at right angles to the centrifuge rotational axis. This results in different flow directions at different points of the centrifuged plates. The function of the orientation layer can then only be realized when rubbed with a soft roller, in general a velvet roller. Also when the process according to the invention is used, the orientation effect can be further improved by rubbing the applied orientation layer consisting of ordered molecules. It is then considerably stronger than an orientation layer that has been applied according to traditional methods and then rubbed.

By maintaining the above-mentioned conditions, the plate is preferably positioned in relation to the centrifuge rotational axis so that the latter transverses the edge of the plate. This has the advantage that a minimum of space is required for carrying out the centrifuge process.

If plates or cells are arranged so that they are parallel to the centrifuge rotational axis, a large opposite air resistance to the rotational movement is created if special measures are not taken, e.g. centrifuging is performed in a vacuum. With the device according to the invention, air resistance to rotation can be considerably reduced due to the fact that the device is a revolving body with a cylindrical outer surface and the cell or the cell plate to be centrifuged is arranged in this revolving body so that it does not project beyond the rim of the latter. The device preferably has a spray device for spraying at least one of the cell plates which are insertable into the revolving body.

DETAILED DESCRIPTION OF THE PREFERRED EMBODIMENT

Figure 1:
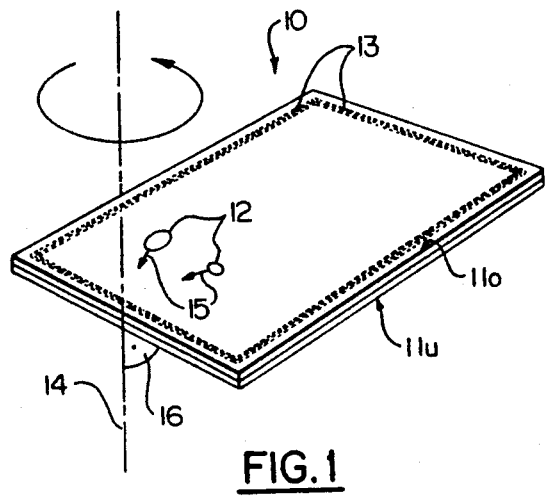
FIG. 1 Perspective view of a cell filled with liquid crystal positioned in relation to a rotational axis so that the plate plane is at a right angles to the rotational axis and the latter transverses an edge of the cell.

The liquid crystal depicted in FIG. 1 contains a liquid crystal between an upper cell plate 11.o and a lower cell plate 11.u, in which two gas bubbles 12 are entrapped. The liquid crystal entrapped between the cell plates is prevented from escaping from the area between the cell plates by an adhesive edge 13. The zone in which the adhesive edge 13 is present and an adjacent zone towards the cell centre are no longer visible in a finished display. This zone of a cell or a single cell plate which is no longer visible in a finished display is hereafter referred to as the "invisible zone". The zone situated within this invisible zone is the "visible zone".

The liquid crystal cell 10 according to FIG. 1 is mounted on a centrifuging device which is not depicted. Only the centrifuge rotational axis 14 of the device is depicted. The liquid crystal cell 10 is positioned in relation to the centrifuge rotational axis 14 so that the latter passes straight through an edge of the cell. If the cell 10 is now quickly spun around this rotational axis 14, centrifugal forces act on the liquid crystal with the result that the gas bubbles 12 move in the direction of the edge lying near the centrifuge rotational axis 14. The movement of the gas bubbles 12 is indicated by the movement arrows 15.

In the arrangement according to FIG. 1, the alignment angle 16 between the centrifuge rotational axis 14 and the liquid crystal cell 10 is approximately 90°. However, the alignment angle 16 can be of any value, e.g. 0°, as in the arrangement according to FIG. 2, which is explained below. For "centrifuging" the gas bubbles 12 into the section of the invisible zone which has the least rotational speed, it is only important that the centrifuge rotational axis 14 lies outside the visible zone.

Figure 2:
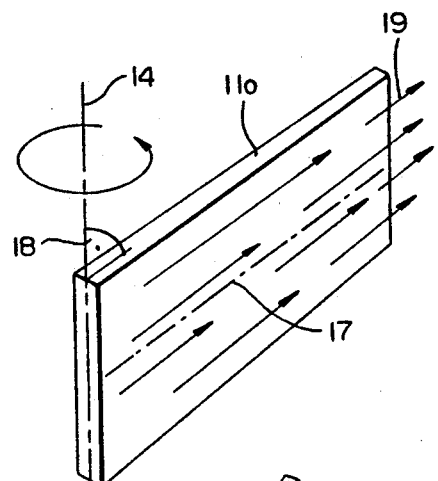
FIG. 2 a perspective view of two cell plates oriented differently, having planes positioned so that a rotational axis lies in them.

The arrangement according to FIG. 2 is used for applying orientation layers (not depicted) on cell plates by means of a centrifuging process. The centrifuge rotational axis 14 runs on the plate plane from top to bottom as depicted in the case in FIG. 1. In a practical application it is advantageous if the rotational axis 14 is not vertical but horizontal. The reasons for this are explained below. Two cell plates are mounted on the centrifuging device (not depicted) to which the centrifuge rotational axis 14 belongs; one is again an upper cell plate 11.o and the other a lower cell plate 11.u. Both cell plates lie in a plane through which the centrifuge rotational axis 14 also passes. The alignment angle, i.e. the angle between the plate plane and the rotational axis, is zero. However, the lower cell plate 11.u is tilted in relation to the centrifuge rotational axis 14 so that its longitudinal axis 17 (represented by a broken line) lies at a setting angle 18 of the value $\alpha$ to the rotational axis 14.

If both plates are rotated at such high speed that the centrifugal forces largely outweigh the force of gravity, essentially only forces at right angles to the centrifuge rotational axis 14 act on a liquid layer applied to the plates. The direction of these forces and the resulting flight direction of centrifuged liquid is marked by parallel centrifuge arrows 19. In the case of the upper cell plate 11.o, the centrifuge arrows 19 lie parallel to the longitudinal axis 17, while those in the case of the lower cell plate 11.u lie at an angle of $90° - \alpha$ to the longitudinal axis 17. Alignment of the centrifuge arrows 19 at precisely right angles to the centrifuge rotational axis 14 occurs if the centrifuge rotational axis 14 is horizontal. The force of gravity then does not act at right angles to the centrifugal force, but in the same direction.

By centrifuging a liquid layer that contains an orientation agent, an orientation layer is obtained after the liquid film has dried. Drying takes place during centrifuging, as in the known centrifuging process. However, whereas, in the conventional arrangement of rotational axis and plate, the centrifuging direction, i.e. the flow direction, is not evenly distributed over the entire plate. Contrary to this conventional arrangement an even distribution is achieved when the rotational axis and the plate plane are related to one another as shown in FIG. 2. The flow direction which is uniform over the whole plate results in an homogeneous pre-orientation of the orientation layer molecules. These layers already having molecules which are homogeneously oriented prove to be better orientation layers than conventional layers, whose orientation effect is produced uniquely by rubbing. However, the orientation effect of layers already having homogeneousy oriented molecules can also be improved by rubbing, preferably with a normal velvet roller.

Figure 3:
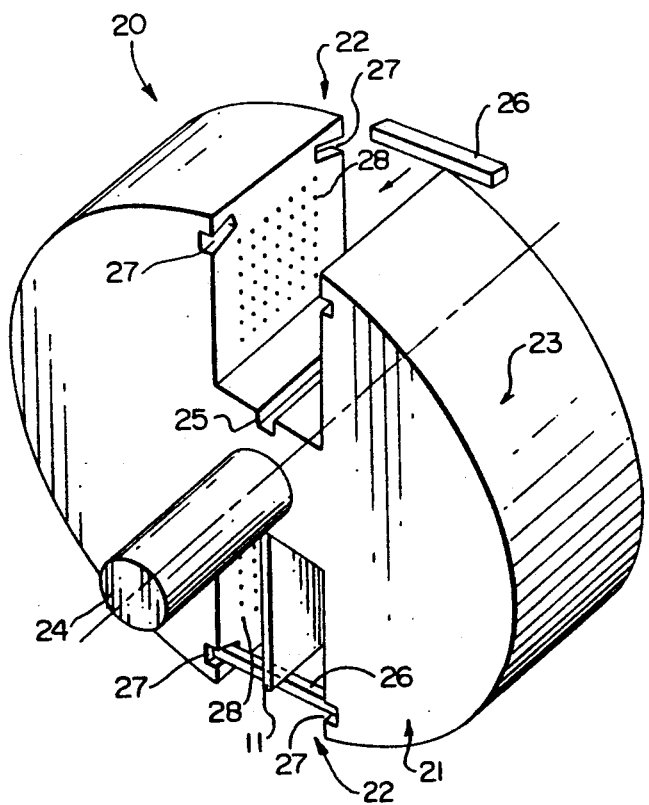
FIG. 3 a schematic perspective view of a revolving body with slots in which cell plates or cells filled with liquid crystal are insertable.

A concrete construction example of centrifuging device 20 in practice for carrying out the process explained with the aid of FIG. 2 is depicted in FIG. 3. The main component of the centrifuging device 20 is a cylindrical wheel 21 with two slots 22, which start near the centre of the cylindrical wheel 21 and open out in the regular cylinder outer surface 23 of the wheel 21. Through the centre of the wheel 21 passes a bearing shaft 24 which represents the physical realization of the centrifuge rotational axis 14.

Each of the two slots 22 which are situated directly opposite each other has a groove 25 at the bottom for inserting the edge of a cell plate. An inserted cell plate 11 is present in the slot which is situated directly under the bearing shaft 24 as shown in FIG. 3. The edge inserted into groove 25 is that which lies closest to the centrifuge rotational axis 14 in the schematic representation according to FIG. 2. In order to prevent the inserted cell plate 11 from being flung out when the cylinder wheel 21 spins quickly, its end near the outer surface 23 is supported by retaining bars 26. These retaining bars 26 are inserted into the recesses 27 in the slot walls after a cell plate 11 is inserted into the relevant groove 25. Each slot wall is provided with spray nozzles 28.

For manufacturing an orientation layer a cell plate 11 is mounted in each of the two slots 22. The cylinder wheel 21 is then set in rotation and accelerated to a speed of approximately 2000 rpm. As soon as the maximum desired speed is reached an orientation-layer-forming liquid is sprayed from the spray nozzles 28 onto each of the two inserted cell plates. The spraying pressure must be sufficiently high for the sprayed liquid to reach the surface of the relevant cell plate in spite of the high deflecting centrifugal force. Before the wheel 21 is braked, the high rotational speed is maintained for a few seconds. By the time lower rotational speeds of a few hundred rpm have been attained, the applied liquid film dried to such an extent that the orientation molecules preoriented by the flow process produced by centrifuging no longer change their position in any significant way i.e. they are "frozen" in their position. The layer is then allowed to harden on the plates. The next operation can be a traditional rubbing process to increase the orientation effect still further.

The centrifuging process explained with the aid of FIGS. 2 and 3 does not need to be restricted to single cells. This process can also be used with larger plates. They are provided with an orientation layer with homogeneously aligned molecules before being divided into single cell plates. In a centrifuging device according to FIG. 3, several plates can be processed simultaneously, e.g. by means of an arrangement in which one plate is positioned in each of several slots or an arrangement as in FIG. 3 in which the slots are relatively wide in design and can therefore accommodate several plates. In the latter case, a maximum of 2 plates per slot can be sprayed. If more plates per slot are inserted, the liquid film which is then centrifuged must be applied by an immersion process and the rotational speed must then be accelerated at such a speed that effective centrifuging and flow occurs before the applied liquid has become excessively.

The device according to FIG. 3 has the advantage that the plates projecting from the rotating axis do not create much air resistance. In order to keep air resistance as low as possible even at high rotational speeds, it is advantageous to keep slots 22 as narrow as possible. It is therefore better to work with several narrow slots each containing one plate than with a low number of wide slots each containing several plates. But even in the case of very narrow slots, air vortices can occur in the slots, especially during rotation acceleration. It is therefore advantageous when the orientation-layer-forming material is not sprayed on until the highest rotational speed has been attained and consequently the air immediately surrounding the cylinder wheel 21 has substantially the same rotational speed as the wheel itself.

A device according to FIG. 3 with a regular cylindrical outer surface 23 and slots 22 can be used for all manufacturing processes in which cell plates or liquid crystal cells must be arranged so that their rotational axes lie parallel to the plate or cell plane during centrifuging. The least space is required when the rotational axis of the device lies in the plane of the slots and the bottom of the slots lies as close as possible to the axis.

Any known material can be used as material for an orientation layer, e.g. a liquid such as one which is mixable from Liquicoat-Imidkit by Merck.

In order to keep air resistance as low as possible during centrifuging, it is advantageous if the slots 22 or other recesses for inserting cells or cell plates are covered after the cells or cell plates are inserted. However, care must be taken, especially when covering slots along the cylindrical outer surface, that whenever orientation layer material is to be centrifuged, centrifuging is not impeded by the covering in such a way that results in uneven material distribution over the plate surface.

What is claimed is:

1. Process for manufacturing liquid crystal cells, characterized in that for coating at least one cell plate with an orientation layer by applying an orientation layer material and centrifuging the orientation layer material in a centrifuge having a rotational axis, the cell plate is arranged in relation to the centrifuge rotational axis so that its plane lies parallel to the centrifuge rotational axis and any projection of the centrifuge rotational axis perpendicularly onto the plate does not traverse a visible plate zone.

2. Process for manufacturing liquid crystal cells, characterized in that for displacing bubbles in a cell filled with a liquid crystal this cell is spun in a centrifuge having a rotational axis, for which purpose the cell is arranged in relation to the centrifuge rotational axis so that the centrifuge rotational axis does not traverse a visible cell zone.

3. Process according to claim 1 characterized in that the arrangement of the plate and the centrifuge rotational axis is such that the rotational axis lies outside the plate.

4. Process according to claim 1, characterized in that the orientation layer material is only applied when the cell plate to be coated has reached its highest centrifugal rotational speed.

5. Process according to claim 2, characterized in that the arrangement of the plate and the centrifuge rotational axis is such that the rotational axis lies outside the plate.

6. Process for manufacturing liquid crystal cells, characterized in that for coating at least one cell plate with an orientation layer by applying an orientation layer material and centrifuging the orientation layer material in a centrifuge having a rotational axis, the cell plate is arranged in relation to the centrifuge rotational axis so that the rotational axis lies within the plane of the cell plate but does not traverse a visible plate zone.

7. Process according to claim 6, characterized in that the arrangement of the plate and the centrifuge rotational axis is such that the rotational axis lies outside of the plate.

* * * * *